Patented Nov. 17, 1936

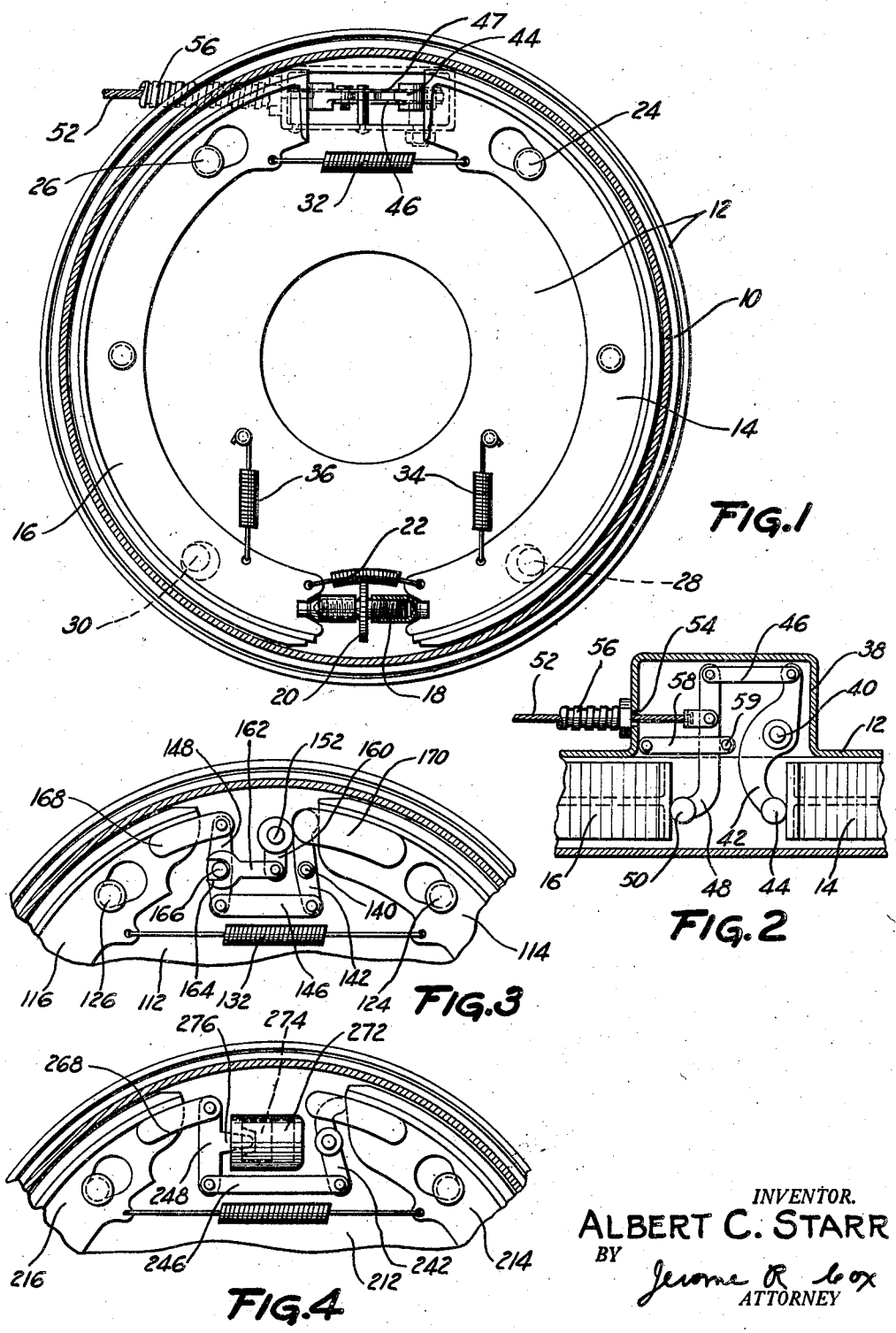

2,060,908

UNITED STATES PATENT OFFICE 2,060,908

FLOATING ACTUATOR

Albert C. Starr, Nephi, Utah, assignor to Bendix Aviation Corporation, South Bend, Ind., a corporation of Delaware Application December 1, 1932, Serial No. 645,308

3 Claims. (Cl. 188—78)

This application relates to brakes and more particularly to improved brake applying means.

One of the objects of my invention is to provide means for transmitting brake applying force equally in opposite directions to opposite ends of a friction element.

A further object of the invention is to utilize a single piston fixed hydraulic cylinder for applying force equally in opposite directions upon a friction device adapted to anchor adjacent one end when turning in one direction and adapted to anchor adjacent the other end when turning in the opposite direction.

A further object of the invention is to provide means for transmitting brake applying force equally in opposite directions to opposite ends of a friction element from a cable and conduit arranged to enter the brake housing in a direction substantially perpendicular to the axis of rotation of the wheel and substantially parallel to the normal direction of movement of the automobile.

Features of my invention include a brake applying lever pivoted upon the backing plate which has one end adapted to contact with the free end of one of the associated brake shoes; a floating lever operatively associated with the free end of the other brake shoe; a link connecting the two levers; and means for applying force to the floating lever.

Further objects and features of the invention will be apparent after a reading of the subjoined specification and claims and after a consideration of the accompanying drawing, in which:

Figure 1 is a view in vertical section of a brake constructed according to my invention;

Figure 2 is a fragmentary view in horizontal section taken substantially on the line 2—2 of Figure 1;

Figure 3 is a fragmentary view in vertical section of a modified form of brake applying means; and Figure 4 is a view similar to Figure 3.

Referring specifically to Figures 1 and 2 of the drawing, there is shown a brake drum 10, a backing plate 12 associated therewith, and a pair of brake shoes 14 and 16 positioned within the drum. The shoes are adjustably connected at their lower ends by a bolt 18 formed with right hand threads at one end and left hand threads at its opposite end. The bolt 18 is provided with a wheel 20 for adjusting the connection and a spring 22 serves to draw the shoes together and to maintain the adjusted position of the connecting bolt 18. The shoes 14 and 16 are adapted to anchor respectively on anchors 24 and 26 and are positioned in their released positions by means of said anchors and by adjustable steady rests 28 and 30 respectively. Springs 32, 34 and 36 serve to return the shoes to their released positions.

As shown most clearly in Figure 2 I provide simple but efficient means for transmitting force equally to the free ends of the two shoes. The backing plate 12 is formed with a laterally extending pocket or projection 38. Pivotally secured to one side of this pocket as at 40 is a lever 42 having at one end a rounded surface 44 bearing upon the end of the shoe 14. Pivotally connected to the opposite end of the lever 42 are a pair of links 46 and 47.

Pivotally connected to the opposite ends of the links 46 and 47 is a floating lever 48. The opposite end of the lever 48 is rounded as at 50 and bears upon the end of the shoe 16. Pivotally connected to a substantially central point of the lever 48 is a cable 52 which passes through an opening 54 in the pocket 38 and thence through a conduit 56 secured to the outside of said pocket. It is to be noted that the conduit extends from said pocket in a direction which is substantially parallel to the normal direction of travel of said automobile and therefore in a direction substantially fore and aft thereof.

A guide plate 58 secured by pins 59 to the pocket 38 serves as a guide for the lever 48.

Pulling force exerted on the cable 52 is transmitted to the lever 48. The force thus acts through the lever 48, the link 46 and the lever 42 to spread the shoes 14 and 16. The shoes anchor, depending on the direction of rotation of the drum, on one of the anchors 24 or 26.

In the modification shown in Figure 3 force is transmitted from the shaft 152 to the shoes 114 and 116 which are adapted to anchor on the anchors 126 and 124 and which are adapted to be returned to released position by return springs including the spring 132. Secured to the shaft 152 is an arm 160 pivotally connected at its end to a pair of like compression members such as 162. The opposite ends of the compression members are forked as at 164 to embrace a pin 166 secured to the floating lever 148.

The floating lever 148 is pivotally connected at its upper end to a pair of parallel plates welded to opposite sides of the web of the shoe 116, one of said plates being shown at 168 and both serving to form an outboard connection between the lever 148 and the web of the shoe 116.

The lower end of the lever 148 is pivotally connected to a pair of parallel links, one of which is shown at 146. The opposite ends of the parallel links are pivotally connected to the lower end of the lever 142 pivoted upon the backing plate 112 at 140. The upper end of the lever 142 is rounded and bears upon the end of the shoe 114 between a pair of spaced plates welded to the web thereof, the nearer thereof being shown at 170.

In the modification shown in Figure 4 a hydraulic cylinder 272 secured to the backing plate 212 is provided with a piston 274 which is adapted to act upon a tongue 276 formed on a lever 248. The lever 248 acts through links such as 246, lever 242 and outboard connections such as 268 to spread the shoes 214 and 216.

Operation of each of the embodiments of my invention shown in Figures 3 and 4 is similar to that described above in connection with the embodiments shown in Figures 1 and 2.

It is to be understood that the above described embodiments of my invention are for the purpose of illustration only and various changes may be made therein without departing from the spirit and scope of the invention.

I claim:

1. In automotive brake apparatus, a brake drum, friction means within said drum, a stationary member associated with said drum, a lever pivotally mounted on said stationary member and having one end bearing upon one end of said friction means, a link pivotally connected to the other end of said pivoted lever, a floating lever having one end pivotally connected to the other end of the link and having the other end bearing upon the other end of said friction means, and means comprising a cable connected to said floating lever for applying force to an intermediate portion of said floating lever.

2. In automotive brake apparatus, a brake drum, friction means within said drum, a stationary member associated with said drum, a lever pivotally mounted on said stationary member and having one end bearing upon one end of said friction means, a link pivotally connected to the other end of said pivoted lever, a floating lever having one end pivotally connected to the other end of the link and having the other end bearing upon the other end of said friction means, and means comprising a cable pivotally connected to said floating lever for applying force to an intermediate portion of said floating lever.

3. In automotive brake apparatus, a brake drum, friction means within said drum, a stationary member associated with said drum, a lever pivotally mounted on said stationary member and having one end bearing upon one end of said friction means, a link pivotally connected to the other end of said pivoted lever, a floating lever having one end pivotally connected to the other end of the link and having the other end bearing upon the other end of said friction means, and means for applying force to an intermediate portion of said floating lever, said applying means comprising a cable connected to said floating lever, the cable being inclosed for part of its length by a conduit connected to said stationary member.

ALBERT C. STARR.